(No Model.)
F. WILKIE.
INDEX DIVIDING ATTACHMENT FOR LATHES.
No. 498,497. Patented May 30, 1893.
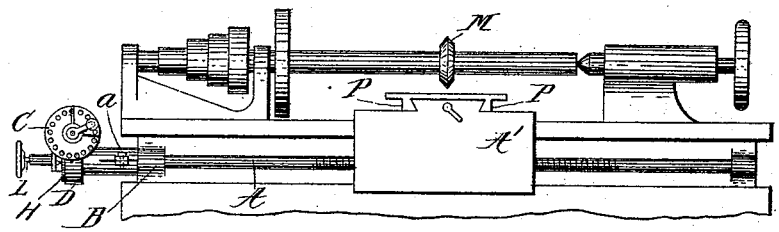
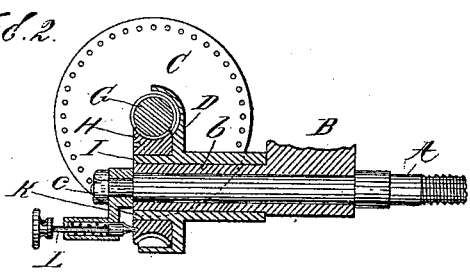
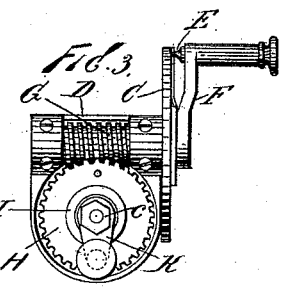
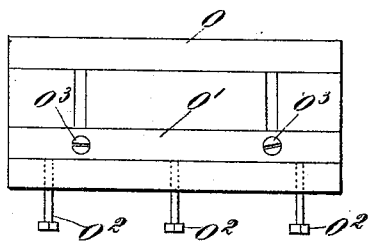
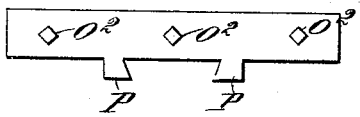
WITNESSES:
John Buckler,
L. H. Osgood
INVENTOR
Fredrick Wilkie,
BY
Worth Osgood
ATTORNEY

UNITED STATES PATENT OFFICE.

FREDRICK WILKIE, OF NEW YORK, N. Y.

INDEX DIVIDING ATTACHMENT FOR LATHES.

SPECIFICATION forming part of Letters Patent No. 498,497, dated May 30, 1893.

Application filed December 23, 1892. Serial No. 456,124. (No model.)

*To all whom it may concern:*

Be it known that I, FREDRICK WILKIE, of New York city, county and State of New York, have invented certain new and useful Improvements in Index Dividing Attachments for Lathes, of which the following is a full, clear, and exact description, reference being had to the accompanying drawings, and to the letters of reference marked thereon.

My invention relates to attachments intended for use upon or in connection with lathes, the primary object of my said invention being to produce or supply a simple, cheap and convenient attachment by use of which one may easily and quickly adapt any screw cutting lathe for the purpose of cutting racks or cutting any other spaced work requiring accurate division—and this without altering the lathe further than to mount the attachment in place, which attachment may be instantly dismounted when required.

To accomplish this object and to secure other and further advantages in the matters of construction, operation and use, my improvements involve a new and useful index dividing attachment arranged to be easily and quickly applied to the lead screw of the lathe or detached therefrom as desired, and new and useful arrangements or combinations of parts as will be herein first fully described and then pointed out in the claims.

In the accompanying drawings forming part of this specification, Figure 1 is a view in elevation representing my index dividing attachment in position upon a screw cutting lathe. Fig. 2 is a sectional view of the attachment along the axis of the lead screw, and Fig. 3 an end view of the attachment. Fig. 4 is a top plan view and Fig. 5 a front elevation of a convenient form of vise which may be employed for holding the work to be cut.

In all these figures like letters of reference wherever they occur indicate corresponding parts.

A is the feed or lead screw of any style of screw cutting lathe. This screw whether at the back or front of the lathe always projects beyond its bearing or box far enough for the reception of the gears employed to drive the screw, and the screw gives motion to the carriage one form of which is indicated at A'.

B represents the box or bearing of whatever form it may be.

Of my attachment C is an index plate secured to the casing D. This plate is perforated to receive the pin E which is mounted in an arm F applied upon a worm G. The worm meshes with a worm wheel H mounted upon a sleeve I in casing D. The casing and sleeve are perforated to receive or fit upon the neck $b$ of bearing B, the neck of the casing being slitted and supplied with a binding screw as $a$ by which it is secured upon neck $b$ when in place for work. A crank K is mounted upon and connected with the lead screw same as are the gears when they are employed, and a nut $c$ holds the crank against accidental displacement. The neck $b$ of bearing B is that which usually receives the yoke employed to carry the intermediate gears when the lathe is being used for cutting screws, and the nut $c$ may be the same which is usually employed to hold the gears in place.

The crank K is supplied with a pin L fitted to enter the perforations supplied in the face of the worm wheel H, for the purpose of coupling the feed screw and worm wheel so that they will, when required, be compelled to move together.

For cutting racks or other spaced work, any suitable form of cutter as M is mounted in the lathe between the centers and is driven by the lathe. The work to be cut is secured in any suitable form of vise which is to be mounted upon the lathe carriage. Of such a vise O may represent the stationary jaw and O' the movable jaw the latter being advanced against the work by screws as $O^2$ and being clamped or held in place by screws as $O^3$. The portions P P are of course planed to fit the ways of the lathe carriage. When in place, the vise, (with the work) is fed toward and from the cutter by the cross feeding arrangement of the lathe of whatever pattern that may be.

The pins E and L are supplied with springs by which they are held in working position but enabling them to be retracted whenever desired. When pin L is in engagement with worm wheel H, this wheel and the feed screw must revolve together. Upon withdrawing pin L the feed screw may be turned by the hand through the medium of crank K and thus the carriage with the work upon it be advanced rapidly and without the necessity of turning the worm G. This affords means for effecting the greater part of the required division without waiting for the slower movements of the index arm (F) which movements are relied upon mainly to accomplish the minute divisions impossible to be effected by the hand alone. Two perforations diametrically opposite each other are preferably supplied in wheel H for the reception of pin L so that the feed screw may be revolved by crank K through exactly half a turn when required.

The number of perforations in the index plate may be varied as required, as may also the relations between the worm and worm wheel.

The pitch of the feed screw varies in different lathes, and for the convenience and rapid use of the attachment a table should be formulated to correspond with the pitch of the particular feed screw in use. For example, suppose the pitch of the screw to be ten (10)—that is, having ten (10) threads to the inch—and that twenty (20) turns of the worm are required to revolve the worm wheel once. Then if the index plate has fifty (50) points or perforations the spacing of the work may be effected to the one ten thousandth ($\frac{1}{10000}$) part of an inch or any multiple thereof as will be apparent from the following. One complete revolution of index pin E over plate C will turn the worm once and communicate one twentieth ($\frac{1}{20}$) of a revolution to wheel H and attached feed screw and therefore cause the carriage to advance one tenth of one twentieth ($\frac{1}{10}$ of $\frac{1}{20}$) of an inch, or one two-hundredth ($\frac{1}{200}$) part of an inch; but if pin E be only advanced from one point to the next (which is one fiftieth of a revolution) the carriage will be advanced but the one fiftieth of one two hundredth ($\frac{1}{50}$ of $\frac{1}{200}$) or one ten thousandth ($\frac{1}{10000}$) part of an inch.

The tables necessary for indicating the movements of the index required to effect any desired division or spacing of the work may be compiled after the usual custom in other index machines, the smallest possible division with the given index-attachment and the given pitch of feed screw having been first computed or ascertained after the manner above indicated.

With the improved attachment a lathe may be readily converted into a dividing or spacing machine and cutter upon which work of extreme accuracy may be accomplished.

The attachment is simple and easy to be applied or removed and will be found to admirably answer all the purposes or objects of the invention previously alluded to.

Having now fully described my invention, what I claim as new herein, and desire to secure by Letters Patent, is—

1. In combination with the feed or lead screw of a screw-cutting lathe, and the carriage moved thereby, an index dividing attachment applied upon said screw and adapted to revolve the same, substantially in the manner and for the purposes set forth.

2. In an index dividing attachment the casing carrying an index plate, the index or pointer and connections for effecting the revolution of the screw, the neck of the said casing being slitted and arranged to be secured upon the neck of the bearing for the feed screw of a screw cutting lathe, substantially as shown and described.

3. In an index dividing attachment the combination with the worm wheel mounted upon a sleeve in the casing, of an arm attached to the feed screw of a screw cutting lathe, said arm being provided with a movable pin for connecting the worm wheel with the feed screw or releasing the same, substantially as and for the purposes set forth.

4. The herein described index dividing attachment for lathes composed of the casing, index, index plate, worm, worm wheel and arm and pin for connection with the lathe feed screw, the parts being arranged and combined substantially as shown and described.

In testimony that I claim the foregoing I have hereunto set my hand in the presence of two witnesses.

FREDRICK WILKIE.

Witnesses:
W. J. MORGAN,
WORTH OSGOOD.